FUNCTION GENERATOR SYSTEM

Filed Aug. 31, 1954 6 Sheets-Sheet 1

INVENTOR.
DAVID G. C. LUCK
BY Morris [signature]
ATTORNEY

INVENTOR.
DAVID G C. LUCK
BY Morris Rabkin
ATTORNEY

April 19, 1960 D. G. C. LUCK 2,933,243

FUNCTION GENERATOR SYSTEM

Filed Aug. 31, 1954 6 Sheets-Sheet 3

INVENTOR.
DAVID G. C. LUCK
BY Morris Raban
ATTORNEY

INVENTOR.
DAVID G. C. LUCK
BY
Morris A. Rabin
ATTORNEY

April 19, 1960 D. G. C. LUCK 2,933,243

FUNCTION GENERATOR SYSTEM

Filed Aug. 31, 1954 6 Sheets-Sheet 5

INVENTOR.
DAVID G. C. LUCK
BY Morris Rabkin
ATTORNEY

INVENTOR.
DAVID G.C. LUCK
BY Morris A. Rabin
ATTORNEY

United States Patent Office 2,933,243

Patented Apr. 19, 1960

2,933,243

FUNCTION GENERATOR SYSTEM

David G. C. Luck, Collingswood, N.J., assignor to Radio Corporation of America, a corporation of Delaware Application August 31, 1954, Serial No. 453,208

19 Claims. (Cl. 235—61)

This invention relates to a system for generating mathematical functions such as may be used in analogue computers.

Shaft rotation as an analogue-computer variable has the very attractive property that there are no strong practical limits on total rotation permissible. For example, shaft rotation through a total range of 10,000 radians, is in most cases entirely acceptable. Since errors that occur in interconnecting shafts through gearing, due, for example, to backlash or eccentricity, are fixed in angular amount rather than cumulative, linear computing operations such as addition, subtraction, or change of scale by a rational factor, can readily be performed to any desired fractional accuracy by a shaft-rotation analogue, by arranging that the total, full-scale rotation angle shall be sufficiently large.

When non-linear operations, such as generation of an arbitrary function of a single variable, or multiplication of two variables, are to be performed in a shaft-rotation analogue, the situation in the existing art is less favorable to acccuracy than when linear operations are to be performed. One single-variable function generator, which may be non-linear, is the simple rotary-motion cam and follower. But this mechanism is limited in total angular range of both its input and its output motions, and so is limited in practically attainable accuracy. Avoidance of these limitations has been sought by use of multi-rotation cam devices of spiral or helical form, which are described, for example, in the book "Computing Mechanisms and Linkages" by Svoboda, McGraw-Hill, 1948, page 19 ff. These cam devices may impose very stiff requirements as to precise mechanical construction of difficult pieces. However, an additional possibility of error is introduced in accumulation of error from revolution to revolution. Functions of two variables, such as their product, may be represented by three dimensional cams. However, the three-dimensional cam is limited in angular range and thus is limited in practically attainable accuracy.

A widely useful function in analogue computers is the square of a single variable. This square function is useful directly in solving triangles by the Pythagorean Theorem. In addition it forms the basis of the "quarter-square" multiplier, which is based on the relationship that the product of two variables is exactly one-fourth the excess of the square of their sum over the squarer of their difference. Thus, provision of an accurate square also provides the basis for an accurate multiplier.

It is among the objects of this invention to provide:

An improved function generating system that has a substantially unlimited working range.

An improved function generating system that operates with high accuracy.

An improved function generating system that is economical in the equipment required and reliable in operation.

An improved function generating system employing cams that has a working range equivalent to that which would be given by a cam of substantially unlimited working range.

An improved analogue computing system that may be used to generate the square function with high accuracy.

In accordance with this invention, a cam function generator comprises a rotatable input shaft, a plurality of cam devices that are connected to the input shaft and define a non-linear function of the shaft rotation over different portions of its range, a movable output device, and individual means for coupling the cam devices to the output device. In addition, a means is provided that is responsive to the shaft rotation and actuates the coupling means to couple the cam devices to the output device during the associated portions of the shaft rotation. One or more of the cam devices may include a cam, a cam follower, gear means connected to the input shaft, and means for summing the mechanical movements of the cam follower and gear means.

An analogue computing system, in accordance with this invention, for deriving a function of a variable signal comprises means responsive to the variable signal for generating first signals in accordance with a non-linear function of the variable over each of a plurality of incremental ranges of the variable, means responsive to the variable signal for generating second signals in accordance with different functions of the variable over the same incremental ranges, and means for adding each of the second signals to the first signals.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figures 3, 4:
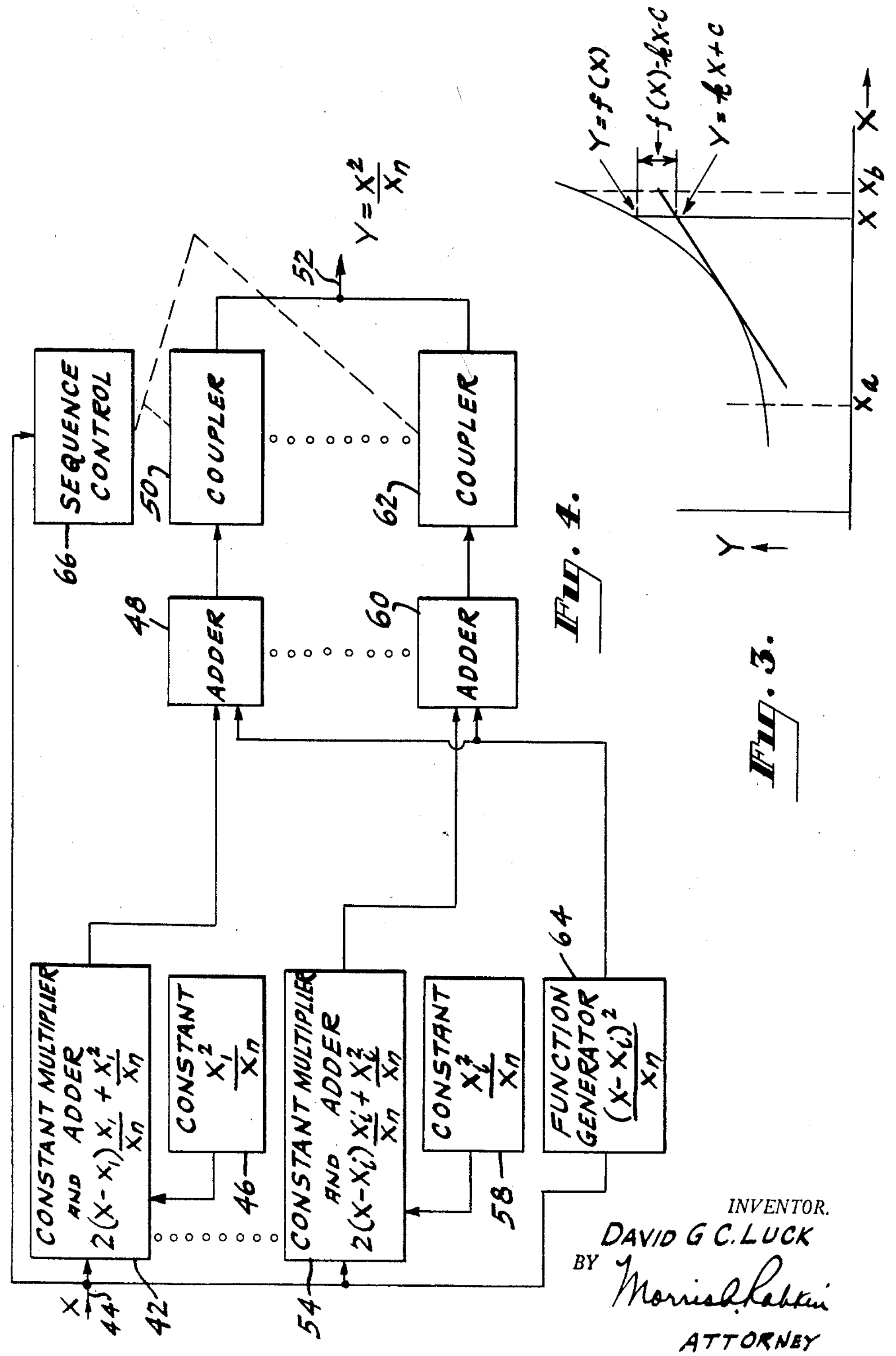
Figure 3 is an idealized graph illustrating the mode of operation in Figure 2.
Figure 4 is a block diagram of an analogue computer embodying this invention that may be used for generating the square function.
Figure 5:
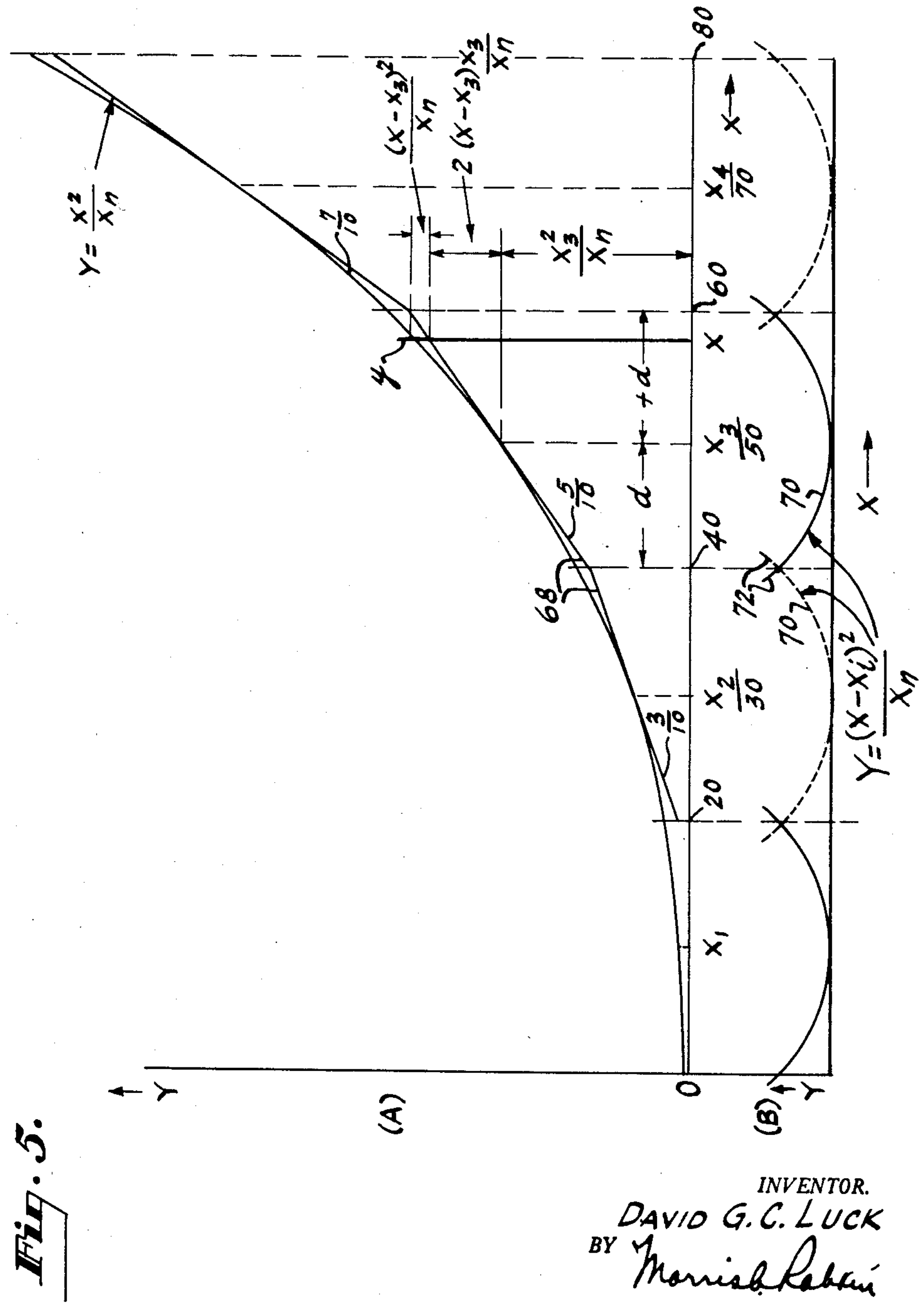
Figure 6:
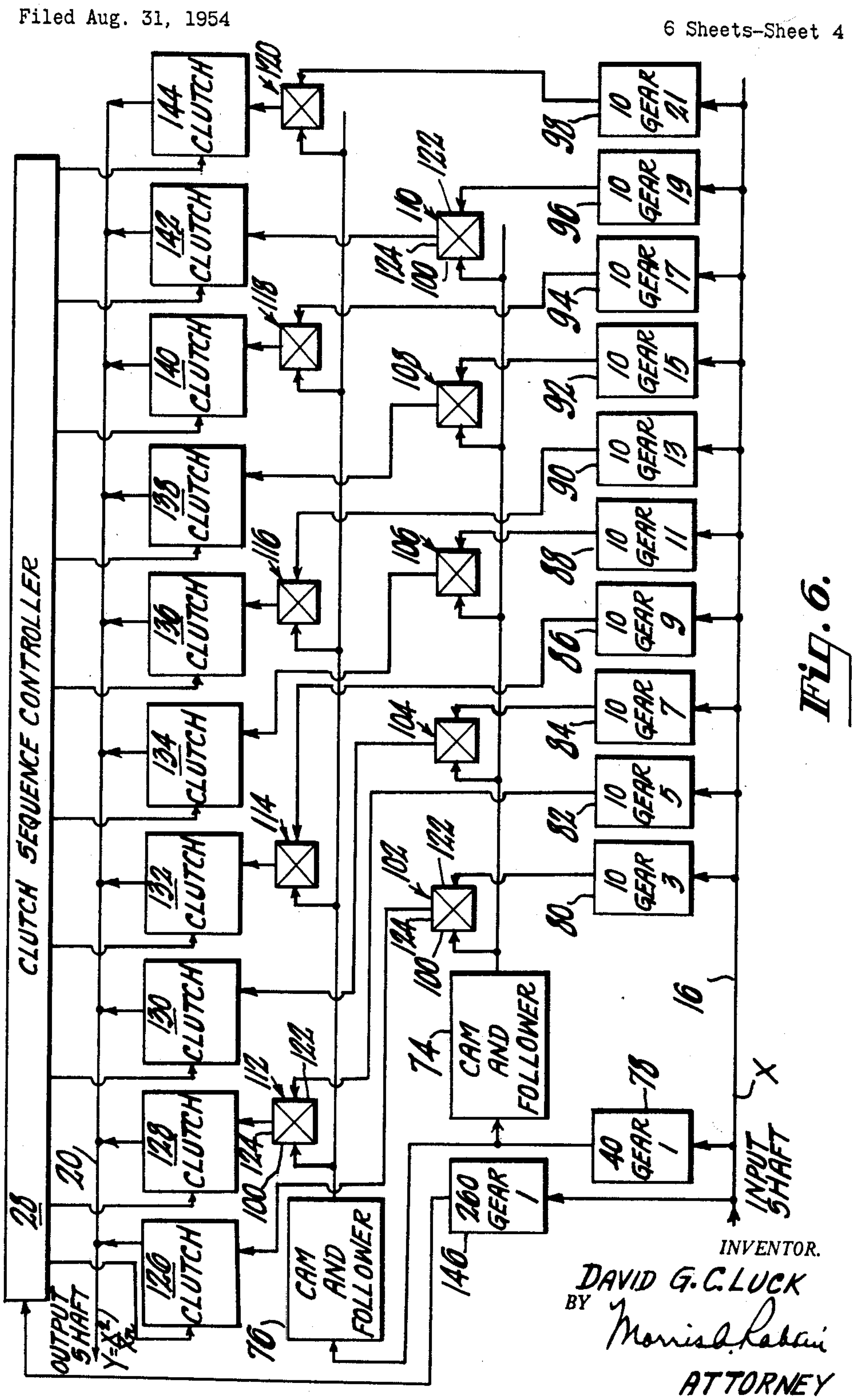
Figure 7:
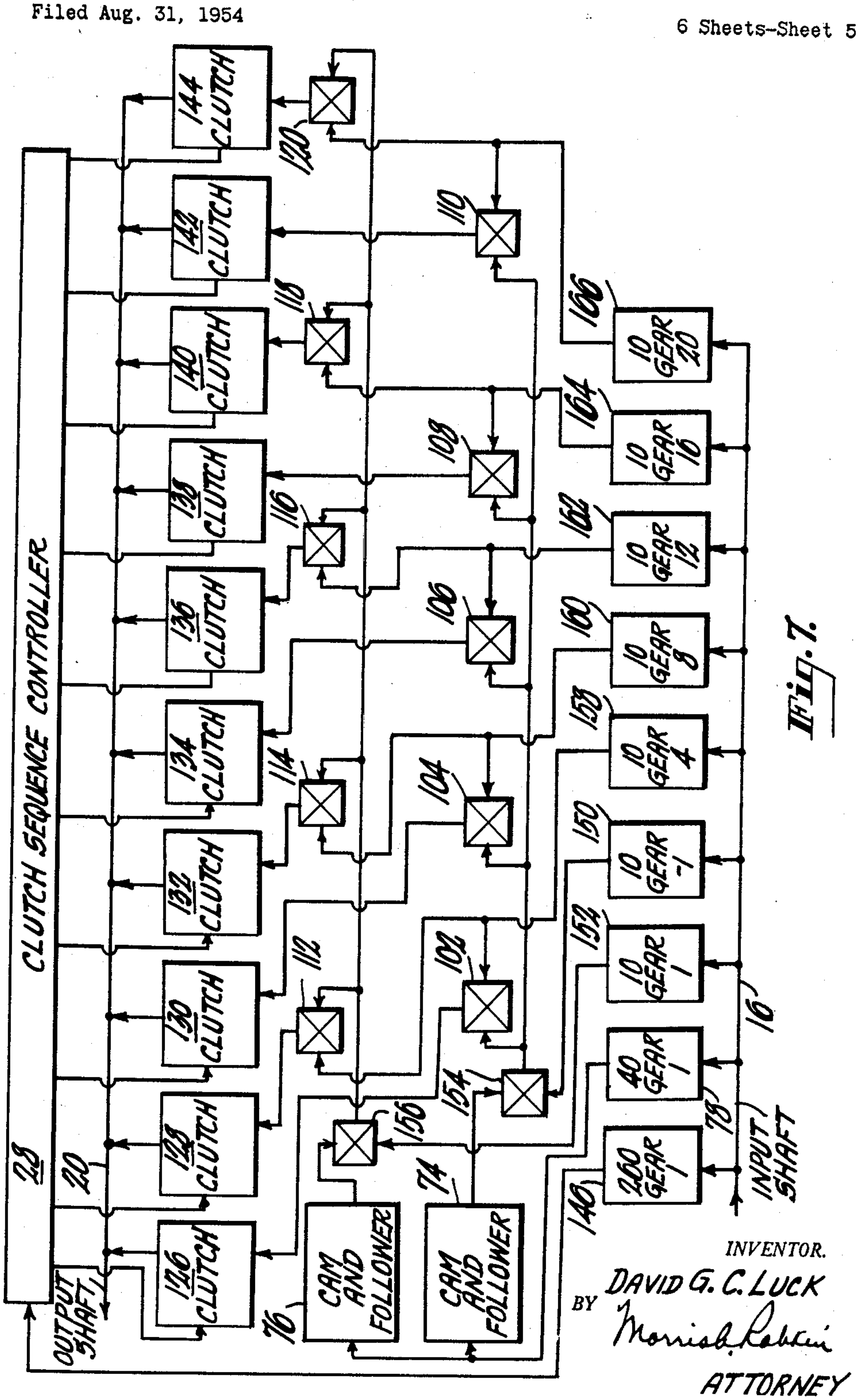
Figures 8, 9:
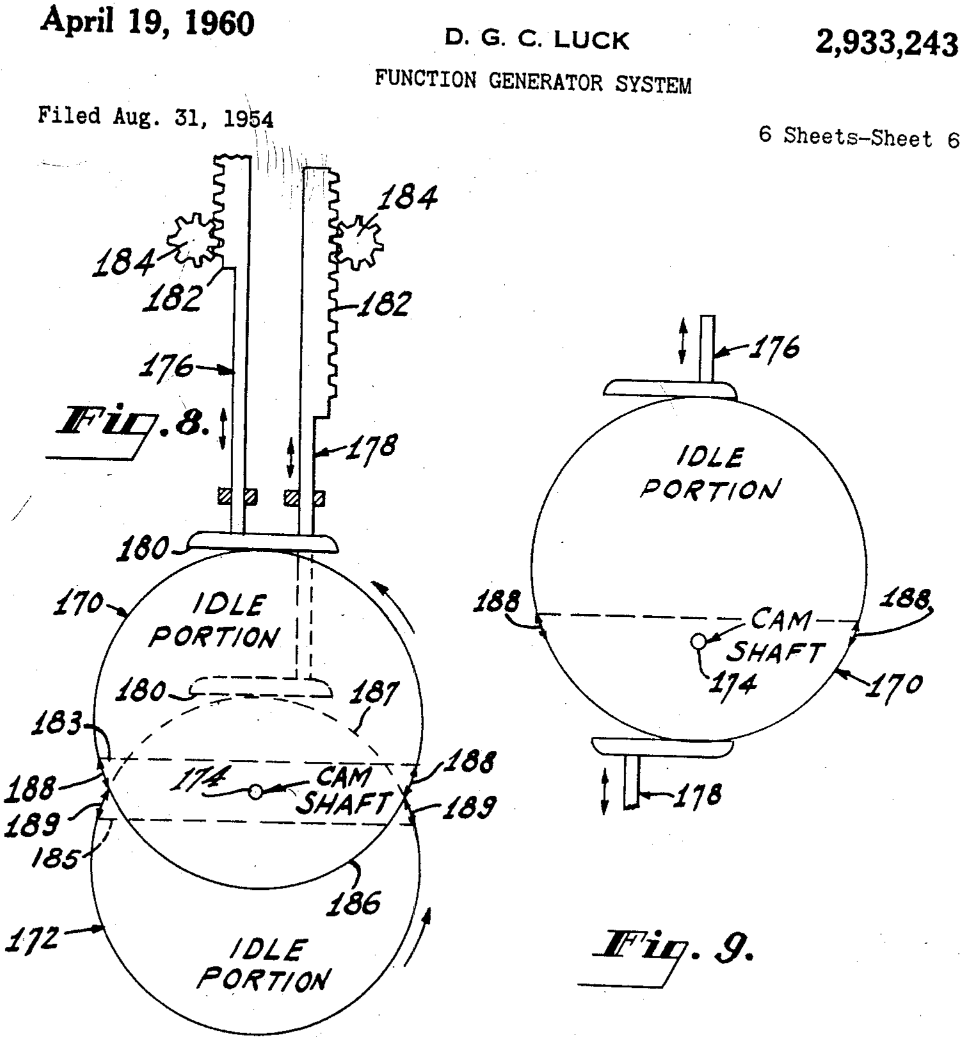

Figure 5, at part A, is an idealized graph illustrating the mode of operation of Figure 4, and, at part B, is an idealized graph illustrating the non-linear function generated by cam mechanisms in the embodiment of Figure 6;

Figure 6 is a block diagram of a computer mechanism for generating the square function and incorporating the principles of the computer of Figure 4;

Figure 7 is a block diagram of a modification of the computer mechanism shown in Figure 6;

Figure 8 is a profile view of a cam and follower system that may be incorporated in the embodiments of Figures 6 and 7;

Figure 9 is a modified cam and follower system; and

Figure 10:
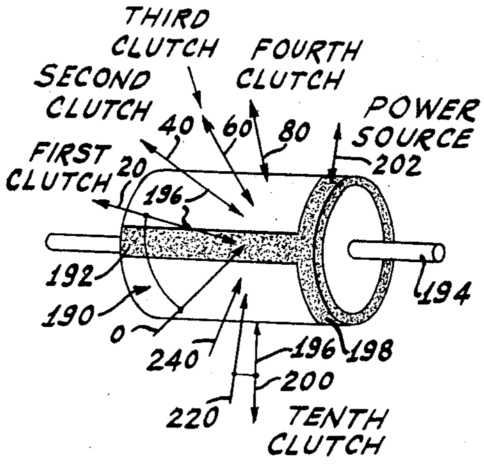

Figure 10 is a perspective view of a commutator that may be used as the clutch sequence controller in the embodiments of Figures 6 and 7.

Figure 1:
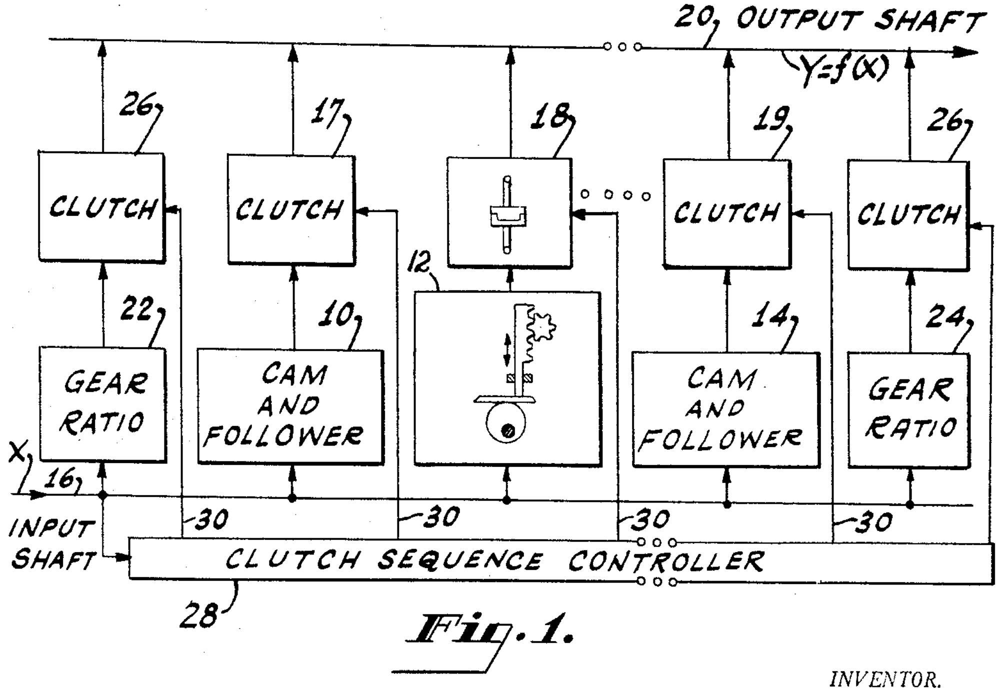
Figure 1 is a block diagram of a function generating system embodying this invention.

Referring to Figure 1, a series of cam devices 10, 12, 14 is provided, only three of which are shown. As many additional cam devices as desired may be incorporated between the second and last devices 12 and 14, as indicated by the dotted line. Each cam device 10, 12, 14 includes a cam and a cam follower. The cams are connected to an input shaft 16 to rotate with that shaft. The cam followers are connected to the inputs of different clutches 17, 18, 19. The outputs of all the clutches 17, 18, 19 are connected to an output shaft 20. Two gear trains 22, 24 are provided; one 22 precedes the first cam device 10 in the series, and the other 24 follows the last cam device 14. These gear trains 22, 24 are also driven by the input shaft 16 and are connected to separate clutches 26. The outputs of the gear-train clutches 26 are also connected to the output shaft 20. A clutch sequence controller 28 is also driven by the input shaft 16 and has a plurality of outputs 30 which are connected to the different clutches 17, 18, 19, 26 to control the engagement and disengagement of the clutches.

Each cam is so designed that it may be rotated without limit in either direction without injury to the cam or follower mechanism. This avoids the need of the input clutches between the input shaft 16 and cams 10, 12, 14 and, thus, the sudden starts and stops of such clutches. The working portions of the cam devices 10, 12, 14 are designed to define a continuous function from the first 10 to the last 14 in the series. The function $Y=f(X)$ to be generated is divided up in any convenient fashion; for example, in accordance with equal increments of the input shaft rotation X, or in accordance with special features of the curvatures of the different portions of the function curve. In the latter case, the increments of X in which the different cam devices 10, 12, 14 are working may be unequal. The end working portions of each cam device 10, 12, 14 are the same as those of both its neighbor cams in the series, both as to the input shaft 16 variable and the output shaft 20 variable. These matching cam portions overlap each other in their rotary positions on the input shaft. The cam devices may be of any appropriate type, such as are described in the book "Computing Mechanisms and Linkages" by Svoboda, cited above.

The output clutches 17, 18, 19, 26 are of the positive-action type and may be typified by gears (not shown) sliding into and out of mesh on a splined output shaft or by clutch plates with toothed faces (not shown). The clutches 17, 18, 19, 26 may be magnetically actuated, and the clutch sequence controller 28 may be a set of electrical commutators and brushes (Figure 10). The sequence controller 28 keeps track of the input shaft 16 rotation and actuates the clutches 17, 18, 19 for engagement only during the portion of the input shaft rotation corresponding to the working portions of the different cam devices 10, 12, 14. Thus, for each value of the input shaft rotation from a starting or zero position, the proper single value of the output shaft rotation is produced from a corresponding zero position. The commutators and brushes are so adjusted as to cause the engagement of one clutch say 18 while the previous clutch 17 is still engaged. The clutch engagement and disengagement takes place in the narrow region where the working portions of the two adjacent cam devices 10, 12 overlap. As a result, in the region of cam overlap, the associated clutches 17, 18 are both engaged and there is no sharp input or output transient upon the shift of clutch engagement. Every change of clutch engagement results in a change from one to the other of two motions to the output shaft 20 which motions have a precisely matched overlap of an adequate range. Since one clutch 18 engages just before the previous one 17 releases, at least one of the clutches 17, 18, 19 is engaged at all times. Therefore, the output shaft 20 is never free to drift by even one clutch tooth.

The gear trains 22, 24 at the ends of the cam mechanisms 10, 12, 14 have gear ratios that match the transfer slopes of the adjacent cam devices 10, 12, 14 in the series. From one end of a predetermined range of the input shaft rotation to the other, the cam devices 10, 12, 14 are connected in sequence to the output shaft 20 through the clutches 17, 18, 19. At the two ends of the range, the gear trains 22, 24 are respectively connected to the output shaft 20 through clutches 26. Thus beyond the input shaft rotation range the output rotation is linear and matches the transfer slopes of the corresponding cams at the end of the series. There is also overlap of engagement of the clutches 17 and 26, and 19 and 26. The clutch sequence controller 28 keeps accurate track of the rotations of the gear trains 22, 24 while their associated clutches 26 are engaged. Thus transfer back to the cam clutches 17, 18, 19 occurs upon return of the input shaft 16 to the working range of the cams 10, 12, 14. As a result of the end gear trains 22, 24, the position of shaft 20 is always positively related to that of shaft 16, without imposing any limits on permissible input and output rotations.

Figure 2:
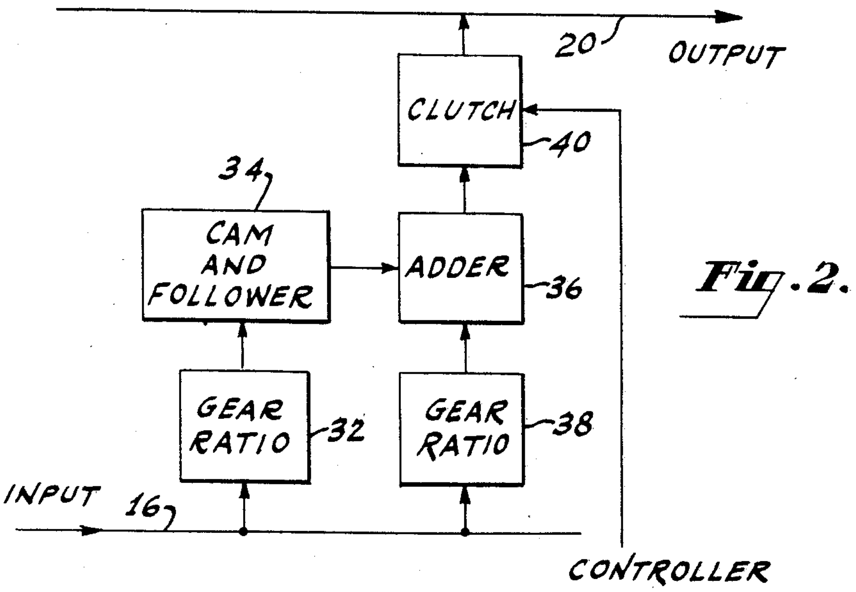
Figure 2 is a block diagram of a modification that may be incorporated in the embodiment of Figure 1.

Referring to Figure 2, a cam device arrangement is shown one or more of which may be used in addition to or in place of any of the cam devices 10, 12, 14 of Figure 1. The input shaft 16 drives a first gear train 32 which in turn drives the cam of a cam and follower mechanism 34. The cam follower drives one input of an adder 36, which may comprise differential gearing. A second gear train 38 is driven by the input shaft 16 and, in turn, drives the second input of the adder 36. The output of the adder 36 is coupled by a clutch 40 to the output shaft 20. The clutch engagement is actuated by the clutch sequence controller 28 during the proper working range of this cam device.

Figure 3 illustrates graphically the operation of the by-passed cam device of Fig. 2. The function to be generated is shown as the curve $Y=f(X)$. The gear train 38 has a gear ratio $k$ and drives the second input to the adder 36 in accordance with $Y=kX+C$, which is the equation of a straight line tangent to the curve. The controller 28 causes the engagement of the clutch 40 in the working range of X from $X_a$ to $X_b$. The ordinate supplied by the cam and follower 34 is that which when added to the ordinate from the gear train 38 will provide the desired function. Thus, the function actually generated by the cam and follower 34 is $Y=f(X)-kX-C$. The output of the adder 36 is the desired function $Y=f(X)$. It is seen from Figure 3, that a function $Y=f(X)$ may depart only slightly from a tangent to the curve, especially in a region of the curve that is fairly steep and monotonic. Thus, most of the ordinate of the function may be generated by gear train 38, while the cam and follower 34 supplies the small difference needed to produce the function accurately. As a result, smaller and simpler cams may be employed. The gear train 38 may also be replaced by another cam and follower mechanism (not shown). In such a case, the adder 36 output is the sum of two non-linear functions.

In general, the shapes of the functions that may be generated are such that the working portion of each cam device spans a different range of the input and output shaft rotation variables. As a result, the sequence controller 28 calls for transfer of coupling of the clutches at unequally spaced points of the input range. Under such circumstances, a gear ratio such as that of the gear-train 32 in Figure 2 may be interposed between the input shaft 16 and cam 34 to simplify the cam design. Under appropriate circumstances another gear-train (not shown) may be interposed between the cam follower 34 and adder 36 in addition to or instead of the gear-train 32.

A specific embodiment of this invention is now described in which the above described features of this invention may be incorporated.

Referring to Figure 4, a block diagram of a computer for generating the square for parabolic function is shown. To avoid any questions of physical dimension and relative scales one may normalize the square function as $$Y=\frac{X^2}{X_n}$$

where X and Y are quantities of a similar physical nature, and Y has the value $X_n$ when X has the value $X_n$. The computer includes a plurality of similar stages. The first stage includes a constant multiplier and adder 42, a constant source 46, an adder 48 and a coupler 50. The constant multiplier 42 receives a variable input signal X from an input device 44 and the constant $$\frac{X_1^2}{X_n}$$

from the source 46 and generates a signal in accordance with the linear function $$2(X-X_1)\frac{X_1}{X_n}+\frac{X_1^2}{X_n}$$

The output of the multiplier 42 is applied to one input of the adder 48 which, in turn, is coupled to an output device 52. Each of the other stages, represented by the dotted line between the first multiplier 42 and the last multiplier 54, are connected in the same fashion. Each multiplier receives the variable X and a corresponding constant term. The operation of the last stage represents the intermediate stages where $i$ takes the values 2, 3, 4, . . . The constant multiplier and adder 54 receives the constant term from source 58 and generates the function $$2(X-X_i)\frac{X_i}{X_n}+\frac{X_i^2}{X_n}$$

This multiplier 54 is connected to one input of the adder 60 which is coupled through coupler 62 to the output device 52. The input X is also applied to a function generator 64 which generates signals in accordance with the non-linear term $$\frac{(X-X_i)^2}{X_n}$$

The output of the function generator 64 is applied to the other inputs of the adders 48, 60. A sequence controller 66 also receives the input variable X and controls the operation of the couplers 50, 62 to connect the adders 48, 60 to the output device at the proper times. Each of the constant multipliers 42, 54 is active during a different predetermined portion of the range of the input variable X. The sequence controller 66 keeps track of the portion of the range in which the input is operating to activate the appropriate one of the couplers 50, 62 and inactivate the others.

Consider the range of the input X during which the first multiplier 42 is active and only the first coupler 50 is activated. The first multiplier and constant terms are summed in the multiplier adder 42. This sum and the non-linear term from the function generator 64 are then summed in the adder 48. The function generator 64 generates the non-linear term $$\frac{(X-X_i)^2}{X_n}$$

when the first multiplier 42 is active, and the associated non-linear terms when the other multipliers are active as explained in detail below. The output of the adder 48 is applied to the output device 52 through the activated coupler 50. The output is $$Y=\frac{X_1^2}{X_n}+2(X-X_1)\frac{X_1}{X_n}+\frac{(X-X_1)^2}{X_n}=\frac{X^2}{X_n}$$

Thus, the output is precisely the desired square function. The result with the first coupler 50 activated is not limited to any particular range of the input X if the range of the function generator 64 is not limited. However, in order to use certain types of apparatus for the function generator, such as cams, it is desirable to provide a different constant multiplier for each of a plurality of intervals of X. The computer operates in the same manner with the coupler 62 activated, and generates the desired square function. All of the constant multipliers 42, 54 operate at the same time. However, only the output of the one constant multiplier whose working interval corresponds to the then existing value of X, is coupled under the control of the sequence controller 66 through the associated adders and coupler to the output device. Accordingly, the square function is precisely generated for each of a plurality of intervals of X.

Referring to Figure 5A, the idealized graphical diagram is employed to illustrate further the mode of operation of the computer of Figure 4. The curve represents the parabolic function $$Y=\frac{X^2}{X_n}$$

The abscissa coordinate is broken up into a plurality of equal intervals and mid-points of which are represented by the points $X_1$, $X_2$, $X_3$, $X_4$. . . . Straight lines 68 are drawn tangent to the curve at the points corresponding to the abscissas $X_2$, $X_3$, and $X_4$. Consider the third abscissa interval containing mid-point $X_3$, for convenience of illustration, and the point X in that interval. The term $$\frac{X_3^2}{X_n}$$

is represented by the ordinate at the point of tangency; this is a constant. The term $$2(X-X_3)\frac{X_3}{X_n}$$

is equal to the product of the slope of the tangent $$2\frac{X_3}{X_n}$$

times the increment from $X_3$ to the point X. Thus, the term $$2(X-X_3)\frac{X_3}{X_n}$$

is represented by the increase in the ordinate value from that at the mid-point of the tangent line 68 to the ordinate at the point on the tangent line corresponding to the abscissa X. The term $$\frac{(X-X_3)^2}{X_n}$$

is represented by the increment in the ordinate between the tangent line and the function curve. This last term is the only non-linear portion of the equation derived by the computer in Figure 4. The term $X-X_3$ represents only an increment of the abscissa X. Therefore, the non-linear term is independent of the value of $X_3$, for any given increment value $X-X_3$. Thus, the non-linear term is the same for each of the intervals of the abscissa, and independent of the particular value of $X_1$. Accordingly, the function generator 64 may be a cyclic device for repeatedly generating the same non-linear term over equal intervals of X, of magnitude $$X_2-X_1=X_3-X_2=\ldots$$

In Figure 5B, the curves 70 of the non-linear term $$\frac{(X-X_i)^2}{X_n}$$

are shown for each of the intervals of the abscissa. These curves are identical, in principle. Alternate curves are shown as broken lines for convenience of illustration. Small extensions 72 of the curves beyond the range of the associated abscissa increment are explained below.

In Figure 6, a block diagram of a computer for generating the square function is shown which employs cam and follower mechanisms 74, 76 both of which produce motions in accordance with the non-linear function curves 70 shown in Figure 5B. The apparatus in Figure 6 is shown with regard to certain specific gear ratios which are related to numerical values shown in Figure 5A for an illustrative problem. The same reference numerals are employed for parts previously described.

The computer of Figure 6 includes two cams and associated followers 74, 76. Both cams are driven by the input shaft 16 through a gear train 78 having a step-down gear ratio of 1:40. Also driven by the input shaft 16 are ten gear trains 80 to 98 which have the step-down gear ratios of 3:10, 5:10, 7:10 . . . 21:10, respectively. The first cam follower 74 drives one end gear 100 of each of five differentials 102 to 110. The second cam follower 76 also drives one end gear 100 of each of five other differentials 112 to 120. The other end gears 122 of all the differentials 102 to 120 are driven by different ones of the gear trains 80 to 98. The spider 124 of each one of the differentials 102 to 120 is connected to the input of a different positive-action clutch 126 to 144. The outputs of the clutches 126 to 144 are all connected to the output shaft 20. The clutches 126 and 144 are actuated by a clutch sequence controller 28 which is driven by the input shaft 16 through a gear train 146 having a ratio of 1:260. Each of the gear trains 80 to 98 represents the slope of the tangent line 68 (Figure 5A) for one of the abscissa intervals starting with the first gear train 80 which has the ratio 3:10 corresponding to the slope of the tangent line at the point 30 ($X_2$).

The numerical values in Figures 5A and 6 illustrate a numerical application of the apparatus. Only a small portion of the function curve is shown in Figure 5A. The range of the input X for which the square function is exactly generated in the numerical example is from 20 to 220 revolutions of the input shaft 16. The normalizing value $X_n$ is 200 input shaft revolutions, the working abscissa interval of each cam (neglecting overlap) is 20 input shaft revolutions, and the maximum cam-profile abscissa increment *d* (neglecting overlap) above and below the mid-point of each interval is 10 shaft revolutions. The maximum non-linear output in the cam working portion (neglecting overlap) is $$\frac{(10)^2}{200}$$

or ½ revolution.

Both cam and follower mechanisms 74, 76 may be identical, and each generates the non-linear function $$\frac{(X-X_i)^2}{X_n}$$

The two cams operate a half revolution out of step so that one is in its working region while the other is in the idle region in which it is uncoupled from the output shaft 20. There is a small region of overlap at each end of the cams which is indicated graphically by the curve extensions 72 in Figure 5B. The cams are geared down to 1/40 of the input shaft speed. Thus, both cams make a complete cycle in 40 revolutions of the input shaft 16 and each cam has a working region of 20 revolutions (neglecting overlap). Changeovers of coupling of the differentials 102–120 to the output shaft 20 occur at 40, 60, 80 . . . 200 input shaft revolutions within tolerances permitted by extending the useful portion of each cam to give a total overlap of 2 to 4 input revolutions.

The constant terms $$\frac{X_i^2}{X_n}$$

are provided by the initial settings of the rotary positions of the gear train 80 to 98 outputs relative to the input shaft 16. The values of these constant terms are 4.5, 12.5, 24.5 . . . 220.5, respectively, for the mid-points 30, 50, 70 . . . 210. Thus, the output of the first gear train 80 is set to be 4.5 revolutions for an initial predetermined position of the input shaft 16 corresponding to 30 revolutions. The first cam and follower mechanism 74 is positioned at the middle, zero-output working point at this initial input shaft position. At another 20 revolutions of the input shaft 16, at 50 revolutions, the second cam and follower 76 is positioned at its middle working point, and the output of the second gear train 82 is set at 12.5 revolutions. The associated constant term may be set into each of the other gear-train outputs in the same manner. The output shaft 20 may be set at a value corresponding to the 30-revolution position of the input shaft 16 and the first clutch 126 engaged. From then on, at least one clutch 126 to 144 is always engaged.

The output of each gear train 80 to 98 functions as an adder summing the constant multiplier linear term provided by the gear ratio and the constant term provided by the initial gear setting. The differentials 102 to 120 sum the non-linear term produced by the associated cam mechanisms 74, 76 and the sum outputs of the associated gear trains 80 to 98, with a constant factor of ½ due to the inherent 1:2 gear ratio between end gears and spider of a differential. Accordingly, throughout any one of the abscissa intervals, the output of the spider 124 of the associated differential 102 to 120 is ½ the desired square function. By appropriate gearing (not shown) the output shaft rotation may be multiplied by 2 to give the exact square function. During each abscissa interval, the sequence controller 28 causes that one of the clutches 126 to 144 associated with that interval to be engaged to couple the associated differential spider to the output shaft 20. In the overlap regions of the cams, both of the associated clutches for the two adjacent abscissa intervals are engaged. In these regions, the two associated cam devices (each made up of a cam and follower, a gear train, and a differential) are generating identically the same function within the small tolerances of cam and gear accuracy. Accordingly, in the overlap region of the cams, the output shaft 20 is driven synchronously by two cam devices through two engaged clutches. Any differences in the simultaneous outputs of the two differentials are extremely small and are readily taken up by the clutches.

For input values below 20 or above 220 revolutions, the first and last clutch 126, 144, respectively, are held engaged. Thus, the conditions holding from 20 to 40 and from 200 to 220 revolutions continue. For the example shown, of 1 revolution of the sequence controller for 260 revolutions of the input shaft, the input shaft may continue on to 0 revolutions in one direction and 240 revolutions in the other without damage done by such continued revolution. By appropriate choice of gear ratio for the gear train 146 such continued rotation may be made essentially indefinite. Of course, there is no computing accuracy below 20 or above 220 revolutions. The actual function generated in these non-computing regions depends on the shape of the idle or non-working region of the cams, one of which remains connected throughout its entire revolution in each of these regions.

Referring to Figure 7, a modification of the computer of Figure 6 is shown. The same reference numerals are employed for parts previously described. Two gear trains 150, 152, having the ratios −1:10 and 1:10, respectively, are driven by the input shaft 16, and drive, in turn, one end gear of two different differentials 154, 156. The other end gears of the differentials 154, 156 are driven, respectively, by the cam followers 74, 76. The spider of differential 154 drives an end gear of each of the differentials 102 to 110; and the spider of differential 156 drives an end gear of each of the differentials 112 to 120. Separate gear trains (not shown) having the gear ratio 2:1 may be connected to the spider outputs of differentials 154, 156 to compensate for the 1:2 step down of those differentials. Five gear trains 158 to 166 are driven by the input shaft 16, and are employed for driving the other end gears of the differentials 102 to 120. The gear train 158 drives the end gears of differentials 102 and 112. The other gear trains 160 to 166 similarly drive two of the differentials 104 to 110 and 114 to 120.

The constant terms $$\frac{X_i}{X_n}$$

are set in the rotary positions of the spiders of the differentials 102 to 120 in a manner similar to that described above. The spider output of the differential 102 is the sum of the constant term, the ratio 4:10 of gear train 158, the ratio −1:10 of the gear train 150 (with compensation for the step down of differential 154), and the non-linear term from cam mechanism 74. Thus, the net gear-ratio term is 3:10 just as in the differential 102 of Figure 6, and the other terms are also the same. It is readily seen that the differential outputs in Figure 7 are the same as their counterparts in Figure 6.

The advantage of the arrangement of Figure 7 lies in the simplification of the gearing. The minus-ratio gear train 150 is always associated with one cam mechanism 74; and the plus-ratio train 152 is always associated with the other 76. The gear trains 158 to 166 supplying the main ratios are less in number by half than their counterparts 80 to 98 in Figure 6. In computations involving a large number of abscissa intervals, there may be a considerable saving in the gearing required.

The cam followers 74, 76 are shown, in Figures 6 and 7, connected to the end gears 100 of the differentials. It is apparent that the cam followers 74, 76 may be connected instead to the spiders 124 of the same differentials to gain the advantage of the inherent 2:1 step up from spider to end gear of a differential. As a result, the required accurate throw of the cam followers can be reduced by ½ for each differential in series. Thus, in the embodiment of Figure 7 having two differentials in series from each cam follower 74, 76, and, in the example given, of a maximum non-linear cam output (neglecting overlap) of ½ revolution, the maximum throw of the cam follower is reduced to ⅛ revolution. Appropriate adjustment of the gear ratios of trains 150 and 152 to −1:20 and 1:20, respectively, may be required in such an arrangement.

Shown in Figure 8, is an example of a cam and follower arrangement appropriate for the embodiments of Figures 6 and 7. The two cams 170, 172 may be approximately circular in profile and mounted eccentrically on a shaft 174. The cam followers 176, 178 may be flat surfaces 180 attached to reciprocating racks 182 that engage pinions 184. The working portions 186, 187 of the cams 170, 174, respectively, are approximately one-half the cam profile which is designed in accordance with the non-linear term $$\frac{(X-X_i)^2}{X_n}$$

The lines 183 and 185 indicate the division of cams 170 and 172, respectively, into working and idle portions. Overlap portions 188, 189 of the cams 170, 174, respectively, extend the working portion to greater than one-half the cam profile.

In Figure 9, a modification of the cam mechanism is shown. A single cam 170 is employed which is same as one of the cams in the embodiment of Figure 8. Two cam followers 176, 178 are employed which engage the cam 170 at opposite sides so that they operate ½ revolution out of phase and are used alternately except in the overlap portions. The operation of the cam arrangement of Figure 9 is the same as that of Figure 8. In principle, a single cam (without an idle portion) and a single cam follower may be used repeatedly instead of two cam mechanisms. However, such an arrangement would not allow for the overlap of adjacent non-linear curves which is necessary to provide an output free of transients. In place of cams, other non-linear devices may be used to generate the non-linear term. For example, bar linkages, such as described in the book cited above, may be used.

In Figure 10, a commutator and brush arrangement is shown which may be used for the clutch sequence controller 28. The commutator may be a drum 190 of insulating material and having a conductive segment 192 on its periphery. The drum 190 rotates on a shaft 194 driven by the input shaft 16 through gear train 146 having a ratio of 1:260 (Figure 6). Thirteen conductive brushes 196 are spaced around the periphery of the drum at equal intervals and in contact with it. The spacing between adjacent contact is slightly less than the width of the conductive segment in accordance with the desired amount of cam overlap. One brush, corresponding to the 20-revolution position of the input shaft 16 is electrically connected to the first clutch 126. In a similar manner, the other brushes 196 corresponding to 40 through 200 revolutions are connected to the associated clutches 128 to 144. The 0-revolution and 220-revolution brushes may be electrically connected respectively to the 20-revolution and 200-revolution brushes. In this way, the first or tenth clutches 126, 144 remain engaged beyond either end of the working range of the computer. The 240-revolution brush may be left unconnected to prevent two inconsistent computing mechanisms from being connected to the output shaft 20 at the same time, in addition to stops or limit switches (not shown) at 0 and 240 revolutions, to prevent any condition with all clutches open.

A conductive ring 198 is also attached to the drum 190 and is connected electrically to the conductive segment 192. A brush 202, continually in contact with the ring 198, is connected to a power source. Appropriate circuitry for energizing magnetic clutches through the commutator and brushes is well known. Such circuitry may include appropriate fast-action circuit breakers such as microswitches, so that the clutches are rapidly and precisely energized and deenergized. If the clutches 126 to 144 are mechanically actuated rather than magnetically, the sequence controller may use gears and intermittent motion mechanisms or timing cams (not shown) rather than an electrical commutator.

It is seen that the present invention never involves a lengthy chain of mechanism between input and output shafts, but merely selects which of a plurality of short chains is active at any given point. The output shaft is always coupled to at least one computing mechanism and is, therefore, never free to drift by even one clutch tooth. There is no chance for large errors to accumulate by accumulation of backlash or irregularity in many parts.

In the embodiments of Figure 7, with only two cams and five major gear trains, the total output range is 240 revolutions as against ½ revolution for the maximum non-linear contribution of the cam (neglecting overlap). The available cam accuracy is about 1 part in 1,000. Therefore, the effect of the cam on overall accuracy is about 2 parts in 1,000,000, and that without the use of step-up gearing at the cam output. If the gearing is good, overall accuracy should be better than 1 part in 100,000.

The squaring computer of Figure 6 and Figure 7 may also be driven in reverse within limits (Y may not be driven to zero). It is apparent, therefore, that the apparatus may be used to take square roots.

It is seen from the above description that the practice of this invention conveys particular advantages in those special cases where a large range of variation of a function can be covered by the use of a relatively few cams. Another such case is that of a simple periodic function, such as a sine or cosine trigonometric function, where each cam may be used over and over on successive cycles.

Apparatus for carrying out the operations of the squaring computer of Figure 4 are not limited to the mechanical type. Various types of electrical apparatus that are appropriate are well known in the art.

In summary, this invention provides a system for splitting a function to be generated into a number of cam mechanized parts that are brought into action sequentially. Cam shapes are employed that may be continuously rotated to avoid input clutches and, thus, to avoid the consequent loss of index and load transients on the driving source. Overlapping cam regions are employed to avoid violent input load and output transients on changeover. Linear-motion bypass of the cams is employed to minimize cam-output requirements. Single cams are used repeatedly where special regularities of the function permit. A system for generating the square function is provided which permits multiple use of a single cam, and which may serve as a part of an improved multiplier.

It is evident from the above description that an improved function generating system is provided that has a substantially unlimited working range, operates with extreme accuracy, is reliable and is economical in the apparatus required. An improved analogue computer is provided for generating the square function.

What is claimed is:

1. A function generator comprising a rotatable input shaft, a plurality of cam devices connected to said input shaft and defining a non-linear function of the rotation of said shaft for different associated portions of said shaft rotation, a movable output device, individual means for coupling said cam devices to said output device, means responsive to said shaft rotation in both of opposite directions for actuating said coupling means to couple said cam devices to said output device during the associated portions of said shaft rotation and to uncouple said cam devices from said output device during other portions of said shaft rotation, wherein at least one of said cam devices includes a cam, a follower for said cam, gear means connected to said input shaft, means for summing the mechanical movements of the cam follower of said one cam device and said gear means, and means connecting said summing means to said coupling means.

2. A function generator comprising a rotatable input shaft, a plurality of cam devices each including a separate cam and cam follower, said cams being fixed to said shaft and rotatable therewith, a movable output device, individual means for intermittently coupling said cam followers to said output device, and means for selectively actuating said coupling means in accordance with the rotation of said input shaft.

3. A function generator comprising a rotatable input shaft, a plurality of cam devices each including a separate cam and cam follower, said cams being fixed to said shaft and rotatable therewith, said cam devices being operationally arranged in a series and defining a continuous function of input shaft rotation, portions of said function defined by adjacent ones of said cam devices in said series being substantially the same, a movable output device, individual means for intermittently coupling said cam followers to said output device, and means for selectively actuating said coupling means in said series in accordance with the rotation of said input shaft as said input shaft rotates from one extreme of a predetermined range to the other extreme.

4. A function generator as recited in claim 3 and further comprising two gear means, and individual means for coupling said gear means to said output device, and wherein said actuating means includes means for actuating one and the other of said gear coupling means respectively when said input shaft rotates beyond said one range extreme and said other range extreme.

5. A function generator comprising a rotatable input shaft, a plurality of non-linear devices connected to said input shaft for producing a mechanical movement that is a non-linear function of the rotation of said shaft for different predetermined portions of said shaft rotation, at least one of said non-linear devices including a non-linear mechanism connected to said shaft, a linear mechanism connected to said shaft, and means for summing the mechanical movements of said non-linear and linear mechanisms, a movable output device, individual means for coupling said non-linear devices to said output device, and means responsive to said shaft rotation for actuating said coupling means to couple said non-linear devices to said output device during the associated portions of said shaft rotation and to uncouple said non-linear devices from said output device during other portions of said shaft rotation.

6. A function generator comprising a rotatable input shaft, a non-linear device connected to said input shaft for producing a mechanical movement that is a non-linear function of the rotation of said shaft for a predetermined portion of said shaft rotation, a plurality of linear devices each connected to said input shaft and associated with a different portion of a predetermined range of said shaft rotation for producing a mechanical movement that is a linear function of said shaft rotation, means for summing the mechanical movements produced by each of said linear devices and said non-linear device, a movable output device, separate means for intermittently coupling said summing means to said output device, and means responsive to said shaft rotation for actuating said coupling means to couple said summing means to said output device during the associated range portion of said shaft rotation.

7. A function generator as recited in claim 6 wherein said non-linear device includes a cam mechanism, and said linear devices each include gear means.

8. A function generator comprising a rotatable input shaft, a plurality of non-linear devices connected to said input shaft and defining a non-linear function of the rotation of said shaft for different predetermined portions of said shaft rotation, a plurality of linear devices each connected to said input shaft and associated with a different portion of a predetermined range of said shaft rotation, separate means for summing the mechanical movements produced by said non-linear devices and certain ones of said linear devices, a movable output device, separate means for intermittently coupling said summing means to said output device, and means responsive to said shaft rotation for actuating said coupling means to couple said summing means to said output device during the associated range portion of said shaft rotation.

9. A function generator as recited in claim 8 wherein said non-linear devices each include a cam mechanism, and said linear devices each include gear means.

10. A function generator comprising a rotatable input shaft, a plurality of cam devices connected to said input shaft and defining a non-linear function of said shaft for different predetermined portions of said shaft rotation, gear means connected to said input shaft, separate means for summing the mechanical movements produced by each of said cam devices and said gear means, a movable output device, separate means for intermittently coupling said summing means to said output device, and means responsive to said shaft rotation for actuating said coupling means to couple said summing means to said output device during the associated range portion of said shaft rotation.

11. A computer for deriving a function of a variable signal comprising means responsive to said variable signal for repeatedly generating first signals in accordance with a non-linear function of said variable over each of a plurality of incremental ranges of said variable, means responsive to said variable signal for generating different second signals in accordance with different functions of said variable, each of said second signals being associated with a different one of said incremental ranges, output means, and means for adding each of said second signals to said first signals to provide associated sum signals and for supplying each of said sum signals to said output means only during the associated incremental range.

12. A computer for deriving a function of a variable signal comprising means responsive to said variable signal for repeatedly generating first signals in accordance with a non-linear function of said variable over each of a plurality of incremental ranges of said variable, means responsive to said variable signal for generating different second signals in accordance with different linear functions of said variable, each of said second signals being associated with a different one of said incremental ranges, output means, and means for adding each of said second signals to said first signals to provide associated sum signals and for supplying each of said sum signals to said output means only during the associated incremental range.

13. A computer as recited in claim 12 wherein said non-linear function generating means and said different linear function generating means are mechanical devices.

14. A computer as recited in claim 12 wherein said non-linear generating means includes a cam and a cam follower, and said different linear function generating means include a plurality of gear means.

15. A computer for deriving the square of a variable signal X comprising means for generating a function of the form $Y=X_i^2+2(X-X_i)X_i+(X-X_i)^2$, wherein the variable, X, is in the *i*th one of a number of consecutive ranges of value, and $X_i$ is a selected value of the *i*th range, said generating means including means responsive to said variable signal for generating first signals in accordance with $2(X-X_i)X_i$, means responsive to said variable signal for generating second signals in accordance with $(X-X_i)^2$, and means for summing said first and second signals.

16. A computer for deriving the square of a variable signal X comprising means for generating a function of the form $Y=X_i^2+2(X-X_i)X_i+(X-X_i)^2$, wherein the variable, X, is in the *i*th one of a number of consecutive ranges of value, and $X_i$ is a mid-value within the *i*th range, said generating means including means for producing first signals in accordance with $X_i^2+2(X-X_i)X_i$ over a plurality of predetermined increments of X, each of said increments including a different $X_i$, means for producing second signals in accordance with $(X-X_i)^2$ over each of said increments, and means for summing said first and second signals.

17. A computer as recited in claim 16 wherein said means for producing first signals and said means for producing second signals include separate mechanisms.

18. A computer for deriving the square of a variable X comprising a rotatable input shaft whose rotation is proportional to X, linear mechanical means connected to said input shaft for producing a first movement in accordance with $X_i^2+2(X-X_i)$ wherein the variable, X, is in the *i*th one of a number of consecutive ranges of value, and $X_i$ is a selected value of the *i*th range, over a plurality of predetermined increments of said shaft rotation X, each of said increments including a different $X_i$, cam means for producing a second movement in accordance with $(X-X_i)^2$ over each of said increments, and means for summing said first and second mechanical movements.

19. A computer as recited in claim 18 wherein said linear mechanical means includes a plurality of gear trains, said cam means includes two overlapping cam mechanisms operating one-half revolution out of phase, and said summing means includes a plurality of differentials each corresponding to a different one of said increments of X, and further comprising an output shaft, and means including separate clutches and responsive to the rotation of said input shaft for coupling at least one of said differentials to said output shaft during the corresponding increment of said shaft rotation X.

References Cited in the file of this patent

UNITED STATES PATENTS

| | | |
|---|---|---|
| 2,444,549 | Anderson | July 6, 1948 |
| 2,481,648 | Dehn | Sept. 13, 1949 |
| 2,624,506 | Dawson | Jan. 6, 1953 |

FOREIGN PATENTS

| | | |
|---|---|---|
| 340,013 | Great Britain | Dec. 12, 1930 |
| 674,227 | Great Britain | June 18, 1952 |